United States Patent [19]

Reimann et al.

[11] 3,888,365

[45] June 10, 1975

[54] STORAGE AND PROCESSING APPARATUS FOR RECORD CARRIERS

[75] Inventors: Herbertus Reimann; Gunter Clauss, both of Dresden, Germany

[73] Assignee: Veb Pentalon Dresden, Dresden, Germany

[22] Filed: Mar. 5, 1973

[21] Appl. No.: 338,240

[52] U.S. Cl............. 214/16 B; 250/224; 340/172.5
[51] Int. Cl............................................. B65g 1/04
[58] Field of Search............ 214/16 B, 16.4 A, 60; 250/555–557, 566–568, 224; 340/172.5; 235/151.11, 61.6

[56] References Cited
UNITED STATES PATENTS

| | | | |
|---|---|---|---|
| 2,940,068 | 6/1960 | Stiefel | 214/16.4 A X |
| 2,941,738 | 6/1960 | Burke et al. | 214/16.4 A X |
| 3,034,643 | 5/1962 | Keller et al. | 340/174.1 C |
| 3,595,388 | 7/1971 | Castaldi | 214/16.4 A X |
| 3,600,557 | 8/1971 | Zappia | 235/61.11 E |
| 3,690,479 | 9/1972 | Castaldi | 214/16.4 A |
| 3,697,680 | 10/1972 | Anstin | 340/174.1 C X |
| 3,756,433 | 9/1973 | Richins | 214/16.4 A |

Primary Examiner—Robert J. Spar
Assistant Examiner—R. B. Johnson
Attorney, Agent, or Firm—William Anthony Drucker

[57] ABSTRACT

A store for record carriers contained in storage units arranged side by side on a support and capable of being withdrawn from said store, said units being selectable by means of codes representing the storage units. Each storage unit is provided with a coding surface on one side. At least one seeker head is provided which is movable relative to said storage units to scan the coding surfaces and to detect a coding surface corresponding to the selected code.

1 Claim, 20 Drawing Figures

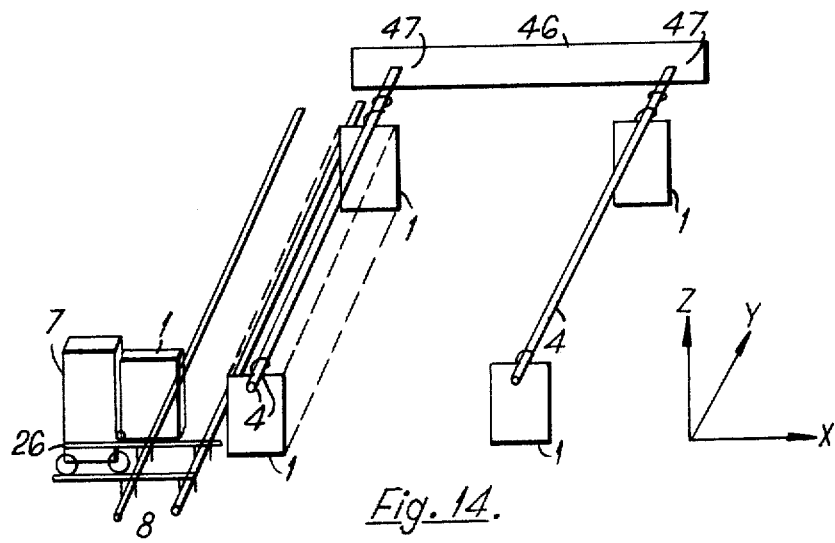
Fig. 14.
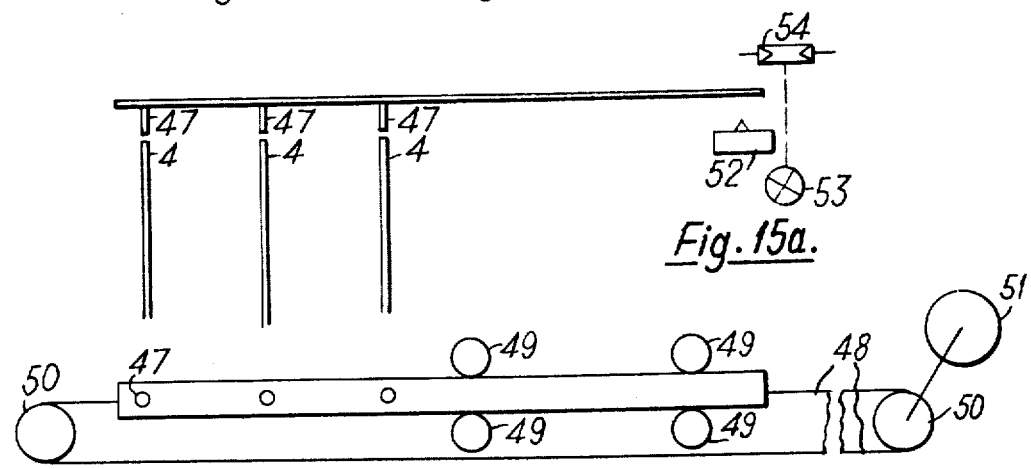
Fig. 15a.
Fig. 15b
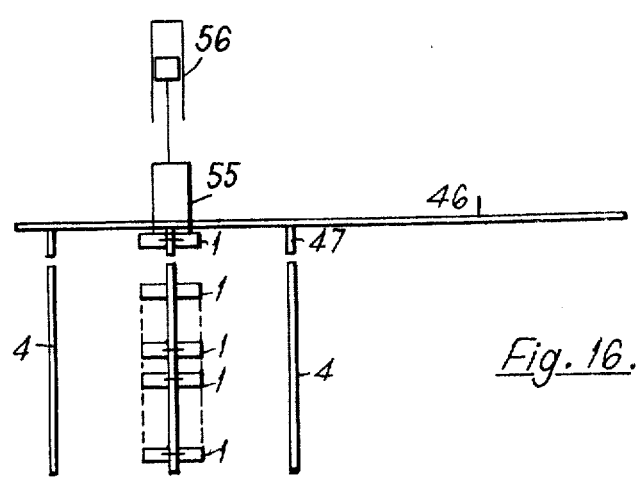
Fig. 16.

3,888,365

STORAGE AND PROCESSING APPARATUS FOR RECORD CARRIERS

BACKGROUND TO THE INVENTION

The invention relates to a central store for record carriers, especially microfilms, the record carriers being uniformly distributed on independent store units, preferably cassettes.

Record carrier stores in the form of card indexes are known in which freely selectable access to every individual record carrier is possible. Moreover it is known to use these card indexes as independent store units of an overall store, to which manual or mechanised access takes place.

These mentioned apparatuses prove entirely advantageous for manual use with a relatively narrowly limited number of record carriers. With the introduction of the microfilm technique and the resultant possibilities of storing recording material in large numbers by means of space-saving media, it becomes necessary however to guarantee automatic access to the overall store with large storage capacity, expediently divided into independent store units, since otherwise an expensive seeking procedure would be the consequence, which is the case with the apparatuses as hitherto if the number of media to be stored increases substantially.

It is the purpose of the invention to store record carriers, even in large numbers, rationally and in reliably accessible manner.

The invention is based upon the problem of providing a store for large numbers of record carriers which permits automatic access to each individual record carrier.

SUMMARY OF THE INVENTION

According to the invention there is provided a store for record carriers contained in storage units arranged side by side on a support and capable of being withdrawn from said store, said units being selectable by means of codes representing the storage units, the provision of coding surfaces on one side of each of said storage units, at least one seeker head movable relative to said storage units to scan said coding surfaces and to detect a coding surface corresponding to the selected code.

The advantages obtained from the invention consist in that a central store is present for a large number of record carriers, where automatic access to each individual record carrier is guaranteed. Thus attachment of this store to electronic data processing installations is rendered possible, since the prerequisites are provided of high storage capacity and automatic access. This again permits more extensive possibilities of application of electronic data processing installations. By way of example this renders possible direct communication between person and computer, which proves advantageous above all in the production of the bases for technological processes in connection with a data bank.

BRIEF DESCRIPTION OF DRAWINGS

The invention is illustrated and described hereinafter by reference to an example of embodiment.

FIG. 14 shows a perspective representation of the transport of the storage units to the collecting bar, FIG. 15a shows a plan view of the collecting bar, FIG. 15b shows a lateral elevation of the collecting bar, FIG. 16 shows the re-introduction in order of a storage unit coming from processing.

DESCRIPTION OF PREFERRED EMBODIMENT

Figure 1:
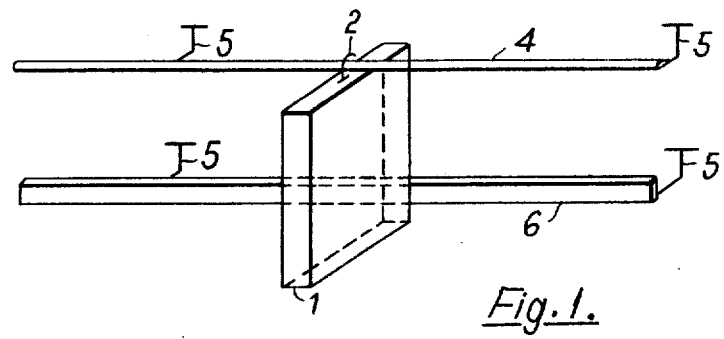
FIG. 1 shows the storage of a store unit in the central store.
Figure 2A:
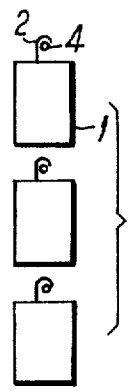
FIGS. 2a and 2b show variants of the arrangement of the store units in the central store.
Figure 2B:
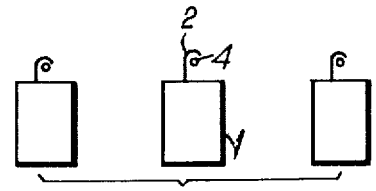
Figure 3A:
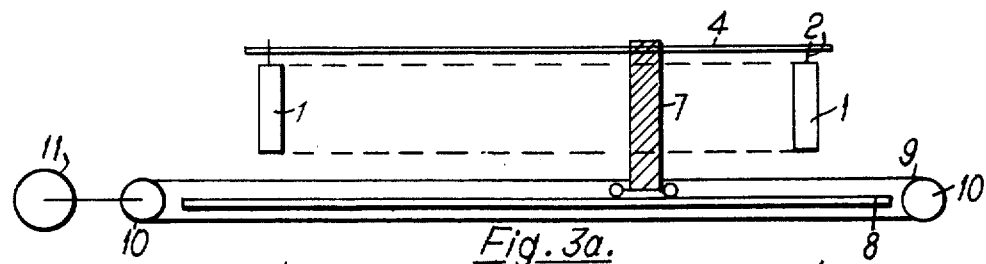
FIG. 3a shows the arrangement of a seeker head in lateral elevation.
Figure 3B:
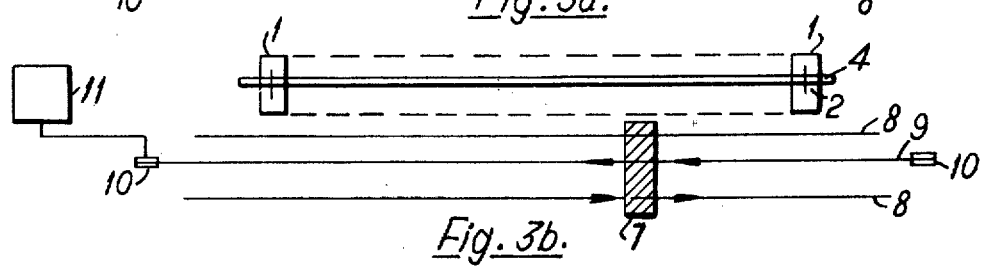
FIG. 3b shows the arrangement of a seeker head in plan view.
Figure 4:
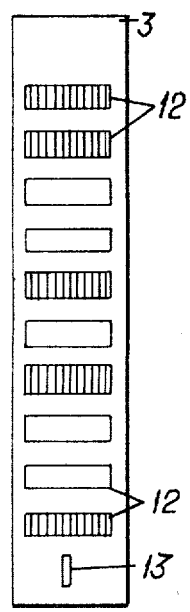
FIG. 4 shows a coding surface with code strips.
Figure 5:
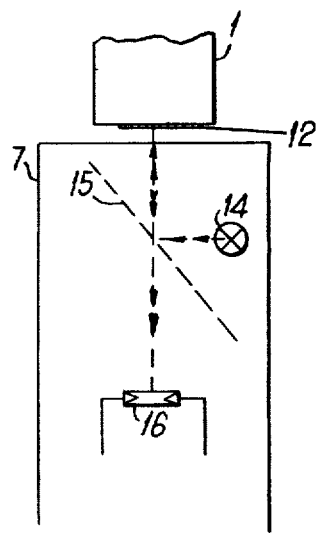
FIG. 5 shows a variant of code detection with optical elements.
Figure 6:
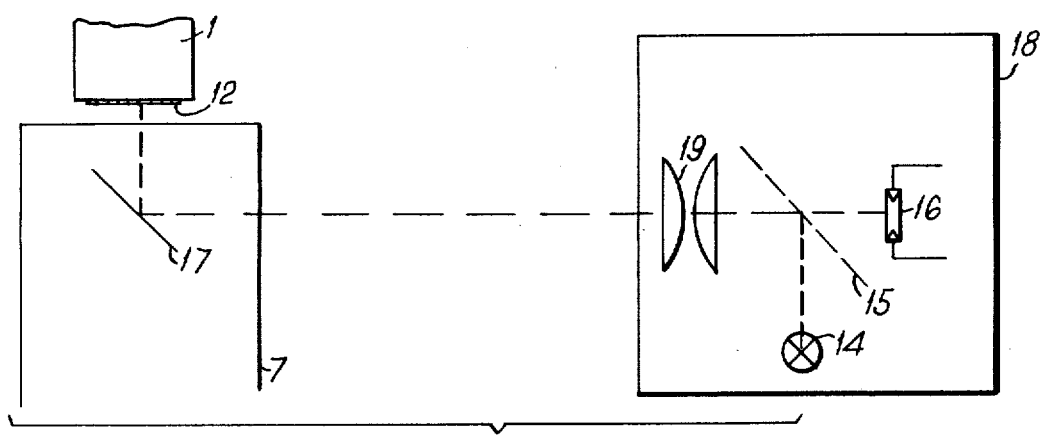
FIG. 6 shows a further variant of code detection with optical elements.
Figure 7A:
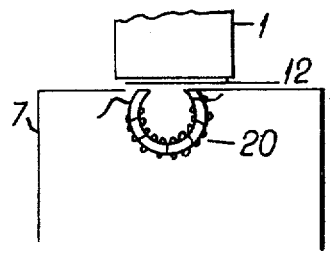
FIG. 7a shows a variant of code detection with electric means.
Figure 8:
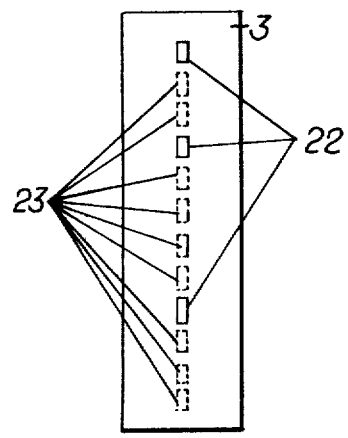
FIG. 8 shows a coding surface with tongues and empty parts.
Figure 7B:
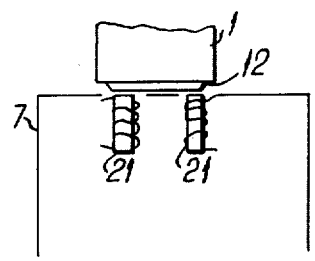
FIG. 7b shows a further variant of code detection with electric means.
Figure 9:
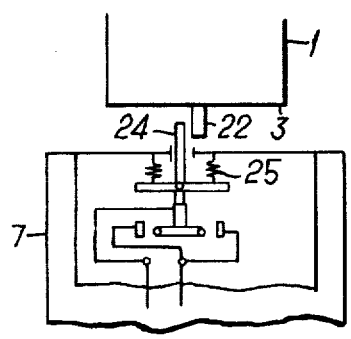
FIg. 9 shows a variant of code detection with mechanical/electrical means.

FIG. 1 shows a storage unit 1 which is mounted suspended by means of a hook 2 on a rod 4 which is connected with supports 5 fast with the housing, the unit resting against a guide strip 6. In FIGS. 2a and 2b there are illustrated variants of the arrangement of the storage units 1 in the central store. FIGS. 3a and 3b represent a seeker head 7 which is conducted by means of a cable 9 over reversing pulleys 10 on tracks 8 along the mounted storage units 1, a reversible electric motor 11 being arranged as drive means. FIG. 4 represents a coding surface 3 which is provided with code strips 12 and a central marking 13. In FIG. 5 it is shown how a light source 14, a partially transparent mirror 15 and, behind the latter, a photoelectric cell 16 are arranged in the seeker head 7 opposite to a code strip 12. In FIG. 6 instead in the seeker head 7 a mirror 17 is arranged, while a lens system 19, the light source 14, the partially transparent mirror 15 and the photoelectric cell 16 are provided in a housing 18 situated outside the seeker head 7. In FIG. 7a instead a toroidal core coil 20 and in FIG. 7b two single core coils 21 are provided in the seeker head 7. FIG. 8 shows a coding surface 3 which is provided with tongues 22 and empty parts 23. In this connection it is shown in FIG. 9 how a lever 24 of a switch comes into engagement with a tongue 22, the lever 24 being connected with return springs 25 fast with the switch housing.

Figure 10:
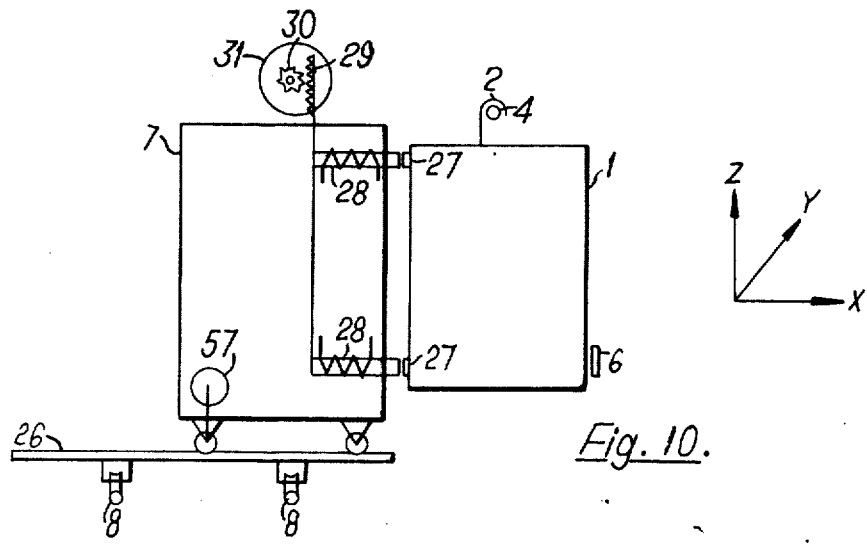
FIG. 10 shows a variant of storage unit take-up by means of force engagement.

FIG. 10 shows how the seeker head 7 is mounted for movement on the tracks 8 in the manner of a cross slide by means of the slide tracks 26 and an electric motor 57. Electromagnetic armatures 27 are arranged on the store units 1, while the seeker head 7 has electromagnets 28 which are in communication with a rack 29, a pinion 30 and an electric motor 31.

Figure 11:
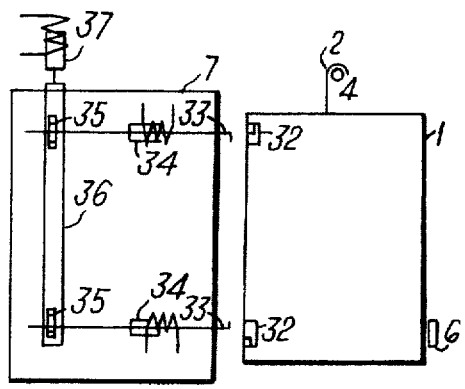
FIG. 11 shows a variant of storage unit withdrawal by means of shape engagement.

In FIG. 11 the storage units 1 have overlapped recesses 32 while keys 33 in the form of bent-over bars are arranged in the seeker head 7 which keys are in communication with electromagnets 34, pinions 35, a rack 36 and an electromagnet 37.

Figure 12:
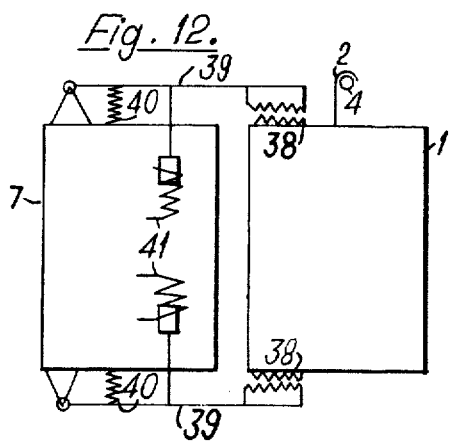
FIG. 12 shows a variant of storage unit withdrawal by means of force and shape engagement.

In FIG. 12 the storage units 1 are provided on the under and upper sides with profiles 38 which are likewise provided on the free ends of gripper arms 39 which are pivotably connected at the other end with the seeker head 7 and where a further connection to the seeker head is also present through compression springs 40 and electromagnets 41.

Figure 13:
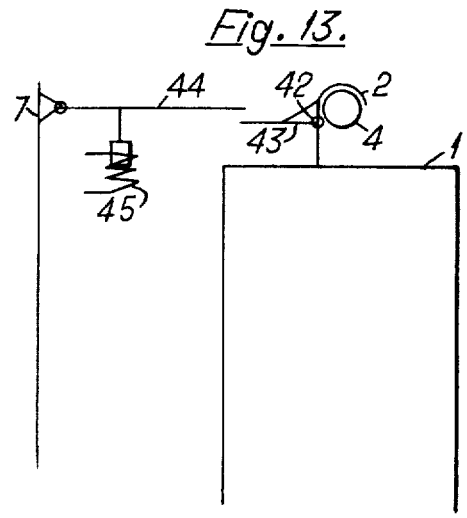
FIG. 13 shows a variant of storage withdrawal without Z-stroke.

In FIG. 13 the hooks 2 of the storage units 1 are each provided with a joint 42 and a lever 43. On the other hand a lever 44 connected with an electromagnet 45 is arranged on the seeker head 7. From FIG. 14 it appears that a collecting bar 46 is provided out of which pins or bolts 47 protrude perpendicularly which are aligned with the rods 4.

FIG. 15 shows a processing station 52 on the extension of the axis of the collecting bar. This processing station 52 comprises a light barrier which consists of a light source 53 and a photoelectric cell 54, this light barrier being arranged at the level of the storage units 1 suspendable on the pins or bolts 47.

It becomes clear from FIG. 15b that the collecting bar 46 is mounted in a guide by rollers 49. It is connected with a reversible electric motor 51 by means of a cable 48 and reversing pulleys 50.

FIG. 16 shows a fork 55 connected with a pneumatic cylinder/piston unit 56, this fork being represented only once here but actually being present in alignment with each rod 4, behind the collecting bar 46.

The central store operates as follows:

For the storage of record carriers, for example microfilms, storage units 1, preferably cassettes, are displaceably mounted on rods 4. The possiblity also exists of designing the storage units 1 as disc stacks or as spools for record media in strip form. The storage takes place in suspended manner by means of hooks 2, the rods 4 being secured with supports 5 fast with the housing. In order to guarantee good mobility of the storage units 1, the rods 4 are provided with an inclination which corresponds to just short of the angle of repose. Thus only a slight pushing force becomes necessary. In order to avoid swinging of the storage units 1 and to ensure the taking up of the storage units 1 for transport, guide strips 6 are provided. According to the number of the storage units 1 it is necessary to distribute them on several rods 4 which are arranged one above and/or one beside the other, as shown by FIGS. 2a and 2b.

The seeking out of the required storage units 1 takes place in sequential manner, in that for each rod 4 a seeker head 7 travels on tracks 8 past the storage units 1. The drive of the seeker head 7 takesplace with the aid of a cable 9 guided over pulleys 10 one of which is driven by means of a reversible electric motor 11. Each storage unit 1 is provided on its side facing the corresponding seeker head 7 with a coding surface 3, and on the coding surfaces 3 and the seeker heads 7 there are arranged mechanical, optical and/or electrical coding elements for coding and code detection of the storage units. Four variants of the formation of the coding elements occur here. In the first case the coding surfaces are provided with very dark and very light code strips 12, the light code strips 12 consisting of a strongly reflecting material, for example of a foil in which there is embossed a pattern of small triple reflectors. Thus a dual coding method is used, in which a dark, non-reflecting code strip 12 corresponds to a O signal and a bright strongly reflecting code strip 12 corresponds to an L signal. A corresponding optical arrangement is provided for each code strip 12 in the seeker head 7, a light source 14 illuminating the code strip by way of the total reflection of a partially transparent mirror 15. In the case of the L signal the photoelectric cell 16 is irradiated by the reflected light penetrating through the partially transparent mirror 15, and gives off a pulse at its terminals. If the code strip corresponds to a O signal, the phototelectric cell 16 remains unilluminated and gives off no signal. The connections of the photoelectric cells are conducted to a known coincidence circuit (not shown). For the seeking operation the code of the desired storage unit 1 is introduced into the coincidence circuit. The seeker head 7 runs with relatively high speed from its initial position past the storage units 1. In the case of coincidence between the preselected code sequence and the scanned code strip 12 of the desired storage unit 1, the reversible electric motor 11 is strongly braked, whereby the seeker head 7 comes to a halt. Since the seeker head 7 has then already run by several storage units widths past the sought storage unit 1, the reversible electric motor 11 is reversed in polarity immediately after halting, the sought storage unit 11 being reapproached slowly by the seeker head 1. When the seeker head 1 has reached the desired storage unit 1, it is stopped by a double coincidence of the code strips and of a central marking 13 which is based upon the same photoelectric principle as in the code strip 12. Thus it is ready to take up the desired storage unit 1.

In the second variant the light beam is conducted only from a housing 18 situated outside the seeker head 7, by way of a lens system 19 and a mirror 17 in the seeker head to the respective code strips 12 and back again, the light source 11, the partially transparent mirror 15 and the photoelectric cell 16 operating in the housing 18 in the same way as in the first variant.

In the third variant the code strips 12 consist of magnetic or non-magnetic material, while in the seeker head there is provided for each code strip 12 either an open toroidal core coil 20 or two simple core coils 21. For the L signal that is in the case of a magnetic code strip 12, a variation of inductance is caused in the seeker head 7 by the coil system, consisting either of a toroidal core coil 20 or of two simple core coils 21, travelling past the code strip 12, the resultant signal being fed again to a coincidence circuit. The movement actions in the course of seeking of the seeker head 7 correspond to the first variant.

The fourth variant provides tongues 22 and empty parts 23 of the coding surfaces 3 which are arranged in accordance with the code for the respective storage units 1. In the seeker head 7 there are mechanically operable electric switches which are settable by means of detent elements (not shown) to the respective heights of the tongues 22. The switches here consist of levers 24 which on contact of the tongues 22 are pivoted so that they briefly close an electric contact and are immediately brought back again into the initial position by return springs 25 fast with the housing of the switch. All the switches are here situated in a circuit which is closed only when all the switches close their contacts at the same time. Thus a coincidence circuit is eliminated, because the closing of the circuit is the signal for the reaching of the desired storage unit 1, whereupon the seeker head 7 is braked and runs back slowly until the switches close the circuit for a second time and the seeker head 7 halts before the required storage unit 1. The central markings 13 are here eliminated. The switches close the respective contact on deflection of the levers 24 to both sides.

A signal transmission from the seeker head 7 to the reversible electric motor 11 takes place in the four variants either through transmitters or through contact sliders and rails on the tracks 8.

After the correct storage unit 1 has been found, its gripping and extraction from the corresponding rod 4 takes place. The respective seeker head 7 takes over this function. It is movable in the manner of a cross slide by means of slide rails 26, so that after the taking out of the sought storage unit 1 for its transport to the collecting bar 46 it can travel with the sought storage unit 1 out of the group of the other mounted storage units 1 by means of an electric motor 57. There are four variants for the picking out of the storage unit 1. The first provides force engagement for this purpose, in that the electromagnets 28 are switched on, placing themselves firmly on the electromagnetic armatures 27. The electric motor 31 is operated, which draws the storage unit 1 out in the Z direction by means of the pinion 30 and the rack 29. The second variant takes place by means of shape engagement, in that the keys 33 are introduced into the overlapped recesses 32 by means of the electromagnets 34 and rotated by the electric motor by means of the rack 36 and the pinions 35.

In the third variant shape and force engagement is used, the profiles 38 of the storage unit being brought into engagement with those of the gripper arms 39 by the electromagnets 41 against the resistance of the compression springs 40. Lifting out takes place as in the first variant.

The fourth variant provides drawing out the storage unit 1 without Z stroke. For this purpose the hook 2 is provided with a joint 42. On the upper part of the hook 2 a lever 43 is secured which on depression pivots the hook 2 over the rod 4. This depression takes place by means of the lever 44 by the electromagnet 45. Admittedly previously detection of the storage unit 1 by one of the above-mentioned variants is necessary.

After the extraction of the storage unit 1 has taken place the seeker head 7 runs off with it to the collecting bar and by means of movements in the X and Z directions it there hangs it with the hook 2 on the pin or bolt 47. The connection of storage unit 1 and seeker head 7 is released and the seeker head 7 runs into its initial position where it is ready for a fresh seeking operation.

The collecting bar 46 ensures that, irrespective of from which rod 4 a storage unit 1 was delivered, the transport of this unit is carried out to the processing station 52 where the recording carriers are further singled according to known principles, for example by means of notch-code selecting. The collecting bar 46 is guided on the rollers 49 and moved by the reversible electric motor 51 by means of a cable 48 over reversing pulleys 50. As soon as the empty seeker head 7 moves back, the collecting bar 46 runs in the direction of the processing station 52 until the light barrier between light source 53 and photoelectric cell 54 is interrupted by the storage unit 1. The reversible electric motor 51 stops here and the storage unit 1 is situated exactly in front of the processing station 52. The distance between processing station 52 and the rods 4 is so selected that in every case the collecting bar 6 then clears all rods 4. From the other side a second collecting bar is driven up and during the processing of one storage unit 1 further units can be sought out. For the transport of the storage unit 1 back, the collecting bar 46 runs back into its initial position. Thus it is ensured that the processed storage unit is situated exactly before the rod 4 from which it was taken for processing and on which there is also space for rearrangement. This takes place due to the fact that a fork 55, operated by a pneumatic cylinder/piston unit 56, pushes the storage unit 1 situated on the pin or bolt 47 on to the rod 4, while at the same time all those storage units 1 are also pushed which are situated as far as the gap produced by the seeking operation. The hook 2 must here be wider than the gap between rod 4 and pin or bolt 47. It is also favourable to provide the rods 4 with an inclination which corresponds nearly to the angle of repose, in order to facilitate pushing. After the pushing off of the storage unit 1 the fork 55 is returned into its initial position.

We claim:

1. A storage and processing apparatus for record carriers contained in storage units arranged adjacent to each other on a support, comprising:
    a plurality of storage units with record carriers;
    at least one horizontally disposed rod forming a part of said support, means on each of said storage units for suspending said storage unit from said rod;
    a coding surface on one side of each of said storage unit, coding elements mounted on said coding surface, means extending along a side opposite to the coding surface to prevent pivotal movement of said storage units when suspended on said rod;
    at least one movable collecting bar with pins thereon for supporting said storage units, means mounting said pins on said collecting bar in a substantially horizontal position in an axial alignment position with said rod;
    record carrier processing station for processing said record carrier contained in said storage unit;
    a seeker unit, at least one seeker head mounted on said seeker unit and operative to scan said coding surface to detect a selected code formed by said coding elements, detecting means mounted on said seeker head to detect said coding elements, each of said detecting means being located at a level corresponding to the level of a coding element;
    storage unit retrieval means mounted on said seeker head, said retrieval means being operative to remove or deposit a storage unit relative to said rod and said pins;
    means mounted on said seeker unit to move said seeker head and storage unit retrieval means thereon to a plurality of storage unit handling positions normal to said rod;
    track means extending at least the combined distance of said rod and pins for supporting said seeker unit for movement in a path parallel to said rod and pins, said track means being located on the side of said storage unit immediately adjacent and facing said coding surface, means to effect travel of said seeker unit along said track means whereby said seeker head and storage unit retrieval means can transfer said storage units between said rod and said pins;

means for effecting and supporting said collecting bar for movement from a first position wherein said pins are axially aligned with said rod to a second position wherein said pins are position at said record carriers processing stations, means located at said processing station for controlling the movement of said collecting bar thereat and reciprocal means located adjacent one side of said collecting bar opposite to said pins for transferring said storage unit from said pins on to said rod.

* * * * *